United States Patent
Kusumoto

(10) Patent No.: US 11,051,146 B2
(45) Date of Patent: Jun. 29, 2021

(54) INFORMATION PROCESSING APPARATUS AND INFORMATION PROCESSING PROGRAM

(71) Applicant: TOYOTA JIDOSHA KABUSHIKI KAISHA, Toyota (JP)

(72) Inventor: Yasuyuki Kusumoto, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/831,962

(22) Filed: Mar. 27, 2020

(65) Prior Publication Data

US 2020/0359181 A1 Nov. 12, 2020

(51) Int. Cl.
*H04W 4/44* (2018.01)
*H04N 7/18* (2006.01)
*H04W 4/029* (2018.01)

(52) U.S. Cl.
CPC ............... *H04W 4/44* (2018.02); *H04N 7/18* (2013.01); *H04W 4/029* (2018.02)

(58) Field of Classification Search
CPC ......... G05D 2201/0213; G05D 1/0246; G05D 1/0221; G05D 1/0253; G05D 1/0278; G05D 1/0212; G05D 1/0287; G05D 1/021; G05D 1/0231; G05D 1/0274; G05D 1/0027; G05D 1/0055; H04L 67/22; H04W 4/44; H04W 4/38; H04W 4/02; H04W 4/029; H04W 4/40; H04W 24/08; H04W 68/005; H04W 84/18; H04W 92/045; H04W 4/021; H04W 4/023; H04W 4/026; H04W 4/027; H04W 4/48; H04W 8/205
See application file for complete search history.

(56) References Cited

U.S. PATENT DOCUMENTS

2019/0306463 A1* 10/2019 Zuckerman .......... G06K 9/6218
2019/0376809 A1* 12/2019 Hanniel .................. G06F 16/29

FOREIGN PATENT DOCUMENTS

JP 2018-055581 A 4/2018

* cited by examiner

Primary Examiner — Kwasi Karikari
(74) Attorney, Agent, or Firm — Oliff PLC

(57) ABSTRACT

An information processing apparatus includes: a location information acquisition unit configured to acquire location information of each of a plurality of vehicles; a vehicle specifying unit configured to specify, based on the location information, a vehicle that has passed through a geographical location or area of a target, from which imaging data captured by the imaging device is collected; and a command transmission unit configured to transmit a command that requests transmission of the imaging data to the specified vehicle among the plurality of vehicles.

4 Claims, 9 Drawing Sheets

INFORMATION PROCESSING APPARATUS AND INFORMATION PROCESSING PROGRAM

CROSS-REFERENCE TO RELATED APPLICATION

This application claims priority to Japanese Patent Application No. 2019-090090 filed on May 10, 2019, incorporated herein by reference in its entirety.

BACKGROUND

1. Technical Field

The present disclosure relates to an information processing apparatus and an information processing program.

2. Description of Related Art

Japanese Unexamined Patent Application Publication No. 2018-055581 (JP 2018-055581 A) discloses a technology in which a vehicle scheduled to travel to a target point from which road information is collected is specified from among a plurality of vehicles, the specified vehicle is requested to collect road information, and the road information collected as requested is uploaded to a center, thereby reducing the amount of data transmitted from the vehicle to the center. The road information may be, for example, imaging data captured by an imaging device mounted on the vehicle.

SUMMARY

However, the vehicle specified in JP 2018-055581 A is a vehicle that is scheduled to travel to the target point from which road information is collected. Accordingly, it is not apparent whether or not the specified vehicle actually travels to the target point, and there is a possibility that a vehicle scheduled to pass through the target point from which road information is collected cannot be specified. Consequently, opportunities for collecting imaging data may be limited.

The present disclosure has been made considering the shortcomings stated above, and is intended to reduce the amount of transmitted data without limiting the collection of imaging data.

An information processing apparatus according to an embodiment of the present disclosure is capable of communicating with a plurality of vehicles, each of which is equipped with an imaging device. The information processing apparatus includes: a location information acquisition unit configured to acquire location information of each of the vehicles; a vehicle specifying unit configured to specify, based on the location information, a vehicle that has passed through a geographical location or area of a target from which imaging data captured by the imaging device is collected; and a command transmission unit configured to transmit a command that requests transmission of the imaging data to the specified vehicle among the plurality of vehicles.

According to the present embodiment, it is possible to specify a vehicle that has actually traveled (passed through) to a target point from which road information is collected, and to collect imaging data from the specified vehicle to the information processing apparatus. Therefore, opportunities for collecting road information are not limited in comparison to a case where a vehicle scheduled to pass through a point from which road information is collected is specified. Additionally, the road information is transmitted from a vehicle that has actually traveled (passed through) to the target point from which road information is collected. Therefore, opportunities for collecting road information are not limited in comparison to a case where a vehicle scheduled to pass through a point from which road information is collected is specified. Additionally, the road information is transmitted from a vehicle that has actually traveled (passed through) to the target point from which road information is collected. Therefore, in comparison to a case where the road information is uploaded from all vehicles capable of communicating with the information processing apparatus, for example, a case where the road information is continuously uploaded regardless of whether or not an event, such as an emergency avoidance operation and an accident, has occurred, according to the present embodiment, only imaging data captured at a time when such an event occurs or during a certain period is uploaded. Accordingly, an increase in the amount of uploaded data can be reduced, thus the overall amount of data communication amount is reduced, thereby reducing communication costs and influence on communication traffic. By reducing the influence on communication traffic, it is possible to more effectively use communication resources. Further, since an increase in the amount of uploaded data is reduced, the burden of data processing in the information processing apparatus, and memory capacity for imaging data in the information processing apparatus can also be reduced, whereby it is possible to reduce manufacturing costs of the information processing apparatus.

Further, in the information processing apparatus according to the embodiment of the present disclosure, the vehicle specifying unit includes a passing determination unit configured to determine, among the plurality of vehicles, a vehicle that has passed through the geographical location or area of the target from which the imaging data is collected, by comparing data collection target area information indicating the geographical location or area of the target from which the imaging data is collected, with the location information.

According to the present embodiment, by using the data collection target area information, it is possible to collect imaging data after specifying vehicles that have passed through an area where an event, such as an emergency avoidance operation and an accident, may have occurred. Consequently, even in a case where, for example, a severe accident occurs and the imaging data is uploaded from lots of vehicles, setting of the data collection target area information is adjusted to focus on the specific event while uploading the imaging data, whereby the burden of data processing in the information processing apparatus is reduced and a delay in information distribution to the user is prevented.

Further, the information processing apparatus according to the embodiment of the present disclosure further includes: an imaging data restriction unit configured to restrict the imaging data transmitted from the vehicle specified by the vehicle specifying unit to data captured during a period from when the vehicle has entered a location or area of the target to when the vehicle has left the location or area of the target, on the basis of passing determination information, which indicates that there is a vehicle that has passed through the location or area, and the data collection target area information indicating the geographical location or area of the target.

According to the present embodiment, since the imaging data restriction unit is provided, the amount of data of the uploaded imaging data is reduced in comparison to a case where all imaging data recorded in the vehicle that has passed through the location or area of the target is uploaded, thus it is possible to further reduce communication costs and influence on communication traffic.

Another embodiment of the present disclosure can be implemented as an information processing program.

According to the present disclosure, it is possible to reduce the amount of transmitted data without limiting a target from which imaging data is collected.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments that carries out the present disclosure will be described in detail with reference to the drawings.

Embodiments

Figure 1:
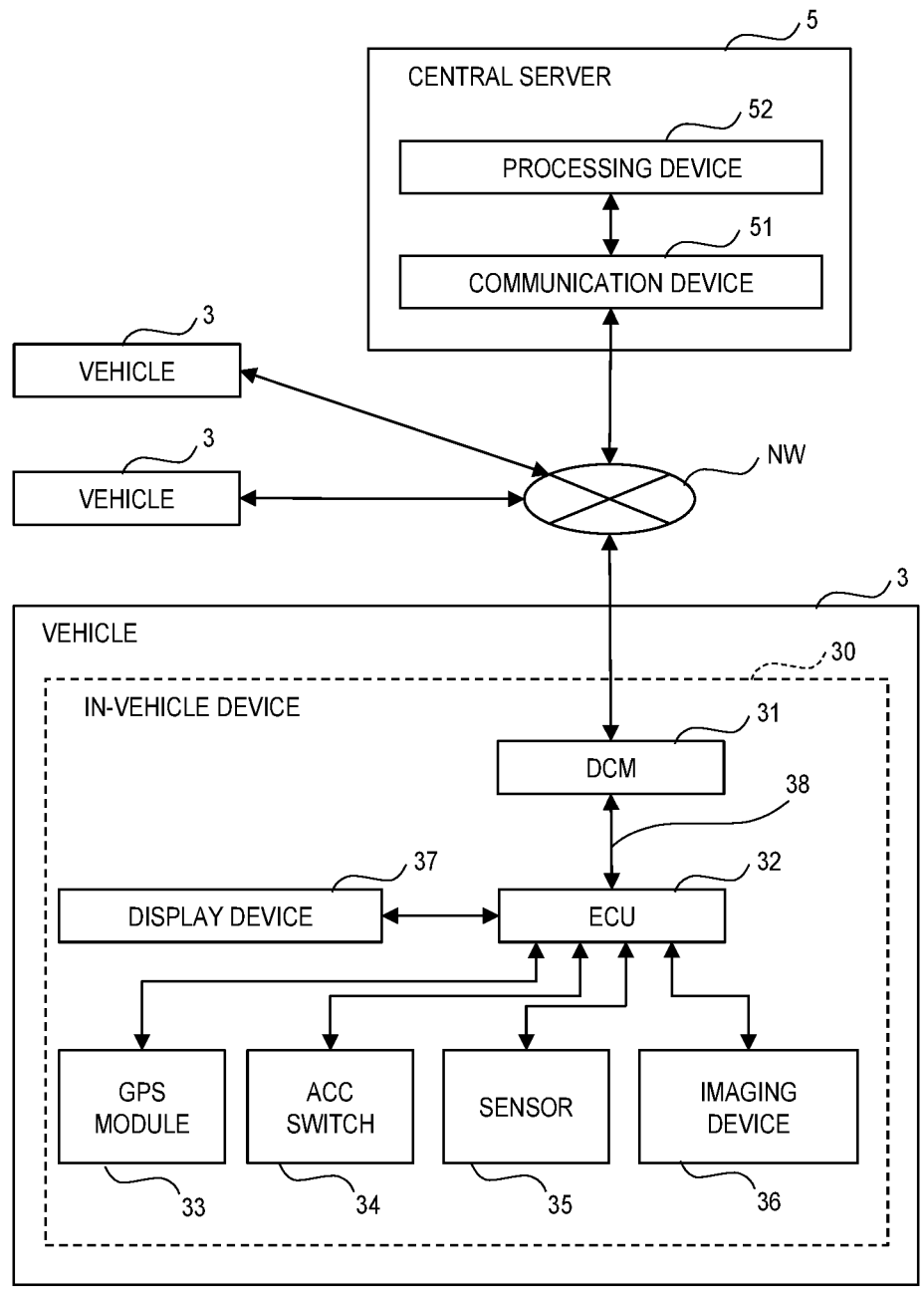
FIG. 1 is a diagram schematically illustrating a configuration of an information distribution system 1 provided with an information processing apparatus according to an embodiment of the present disclosure.

FIG. 1 is a diagram schematically illustrating a configuration of an information distribution system 1 provided with an information processing apparatus according to an embodiment of the present disclosure. The information processing apparatus may be, for example, the data communication module (DCM) 31, and a processing device 52 provided in the central server 5, shown in FIG. 1.

The information distribution system 1 includes an in-vehicle device 30 mounted on each of the vehicles 3 and a central server 5 capable of communicating with the in-vehicle device 30. Hereinafter, the vehicle 3 may be simply referred to as a 'vehicle_ or 'vehicles_. The vehicle is not limited to a passenger car but may be a freight vehicle, a bus, or the like.

The in-vehicle device 30 includes the DCM 31, an example of the information processing apparatus, as well as an electronic control unit (ECU) 32, a global positioning system (GPS) module 33, an ACC switch 34, a sensor 35, an imaging device 36, a display device 37, and the like. The vehicle 3 may be provided with, for example, a navigation device, an audio device, an inverter, a motor, or auxiliary equipment, in addition to the in-vehicle device 30. The auxiliary equipment includes an air conditioner, a radiator fan, a rear defogger, and the like.

The DCM 31 is a communication device that performs bidirectional communication with the central server 5 via a communication network NW. The communication network NW may be, for example, a cell phone network having base stations as terminals, or a satellite communication network using communication satellites. Further, the DCM 31 is connected to the ECU 32 via a controller area network (CAN) 38 that is an in-vehicle network, and transmits various information to the outside of the vehicle 3 and inputs information received from the outside of the vehicle 3 to the ECU 32 according to a request from the ECU 32.

The ECU 32 is an electronic control unit that performs various control processes related to predetermined functions in the vehicle 3, and may be, for example, a motor ECU, a ECU for a hybrid system, or an engine ECU. For example, the ECU 32 may collect vehicle information and input such information to the DCM 31. The vehicle information may be, for example, information on a state of the vehicle 3, or imaging information. The information on the state of the vehicle 3 may be, for example, detected information detected by various sensors such as the GPS module 33 and the ACC switch 34. The imaging information may be imaging data representing an image captured by one or more imaging devices 36 provided on the vehicle, time information indicating a time when the image is captured, or the like.

The imaging device 36 is an omnidirectional camera, a panoramic camera or the like, which captures scenery around the vehicle. The imaging device 36 may include, for example, an imaging element such as a charge-coupled device (CCD) or a complementary metal oxide-semiconductor (CMOS).

The scenery around the vehicle may be, for example, scenery in front of the vehicle, a scenery on a side of the vehicle (a side of a drivers door or a side of a passengers door, of the vehicle), and scenery behind the vehicle. The scenery may include, for example, a roadway on which the vehicle is traveling, an object existing on the roadway, a sidewalk facing the roadway, or an object on the sidewalk. Examples of an object on the roadway include passenger cars, motorcycles, buses, taxis, buildings, structures (billboards, road signs, traffic lights, telephone poles, or the like), persons, animals, and fallen objects. Objects on the sidewalk may be, for example, pedestrians, animals, bicycles, structures, animals, and fallen objects. The imaging device 36 continuously captures the scenery around the vehicle while the vehicle is traveling. The captured imaging data is held in a specific recording unit provided in the vehicle. When a transmission request from the central server 5 is issued, the imaging data held in the recording unit is transmitted to the central server 5. Details of a configuration and operation for transmitt ng the imaging data to the central server 5 will be described later.

The GPS module 33 receives a GPS signal transmitted from a satellite, and measures a location of the vehicle 3 on which the GPS module 33 is mounted. The GPS module 33 is communicably connected to the ECU 32 via the CAN 38, and the location information of the vehicle 3 that has been measured is input to the ECU 32.

The ACC switch 34 turns ON/OFF an accessory power supply of the vehicle 3 according to a predetermined operation by an occupant of the vehicle 3, such as a driver. For example, the ACC switch 34 is turned ON/OFF according to an operation of a button switch for operating a power switch provided on an instrumental panel near a steering wheel of a drivers seat in a vehicle compartment, for example, the ACC switch 34 or an ignition switch (IG switch, not shown). An output signal of the ACC switch 34 is an example of information indicating starting and stopping of the vehicle 3. Specifically, in a case where the output signal of the ACC switch 34 changes from an OFF signal to an ON signal, the starting of the vehicle 3 is indicated. In a case where the output signal of the ACC switch 34 changes from the ON signal to the OFF signal, the stopping of the vehicle 3 is indicated. The ACC switch 34 is communicably connected to the ECU 32 and the like, via the CAN 38, and a state signal (ON signal/OFF signal) is input to the ECU 32.

The sensor 35 may be, for example, a voltage sensor that detects a voltage input to the inverter, a voltage sensor that detects a voltage input to the motor, a speed sensor that detects speed of the vehicle, an accelerator sensor that detects a degree of accelerator opening, or a brake sensor that detects a brake operation amount. The sensor 35 may be an accelerator pedal sensor that detects an operation state of an accelerator pedal of the vehicle 3, a brake pedal sensor that detects an operation state of a brake pedal, a steering sensor that detects an operation state of a steering wheel, or the like. Further, the sensor 35 may include, for example, an acceleration sensor that detects acceleration of the vehicle 3, and an angular velocity sensor (gyro sensor) that detects an angular velocity of the vehicle 3. The detected information output from the sensor 35 is taken into the ECU 32 via the CAN 38.

The display device 37 is arranged at a location that is easily visible from the occupant of the vehicle 3, such as the driver, for example, at an upper center of the instrument panel in the vehicle compartment, and displays various information screens and various operation screens under the control of the ECU 32. The display device 37 may be, for example, a touchscreen liquid crystal display.

The central server 5 is a server that collects information from the vehicles 3 and provides various services by distributing information to users of the vehicles 3. The various services may be, for example, a car sharing service, an authentication key service, a trunk delivery service, and a B2C car sharing service.

The central server 5 includes a communication device 51 and a processing device 52.

The communication device 51 is a communication device that performs bidirectional communication with each of the vehicles 3 via the communication network NW under the control of the processing device 52.

The processing device 52 executes various control processes in the central server 5. The processing device 52 is configured by a server computer that may include, for example, a central processing unit (CPU), a random access memory (RAM), a read-only memory (ROM), an auxiliary storage device, and an input/output interface.

A hardware configuration of the ECU 32 of the in-vehicle device 30 will be described with reference to FIG. 2.

Figure 2:
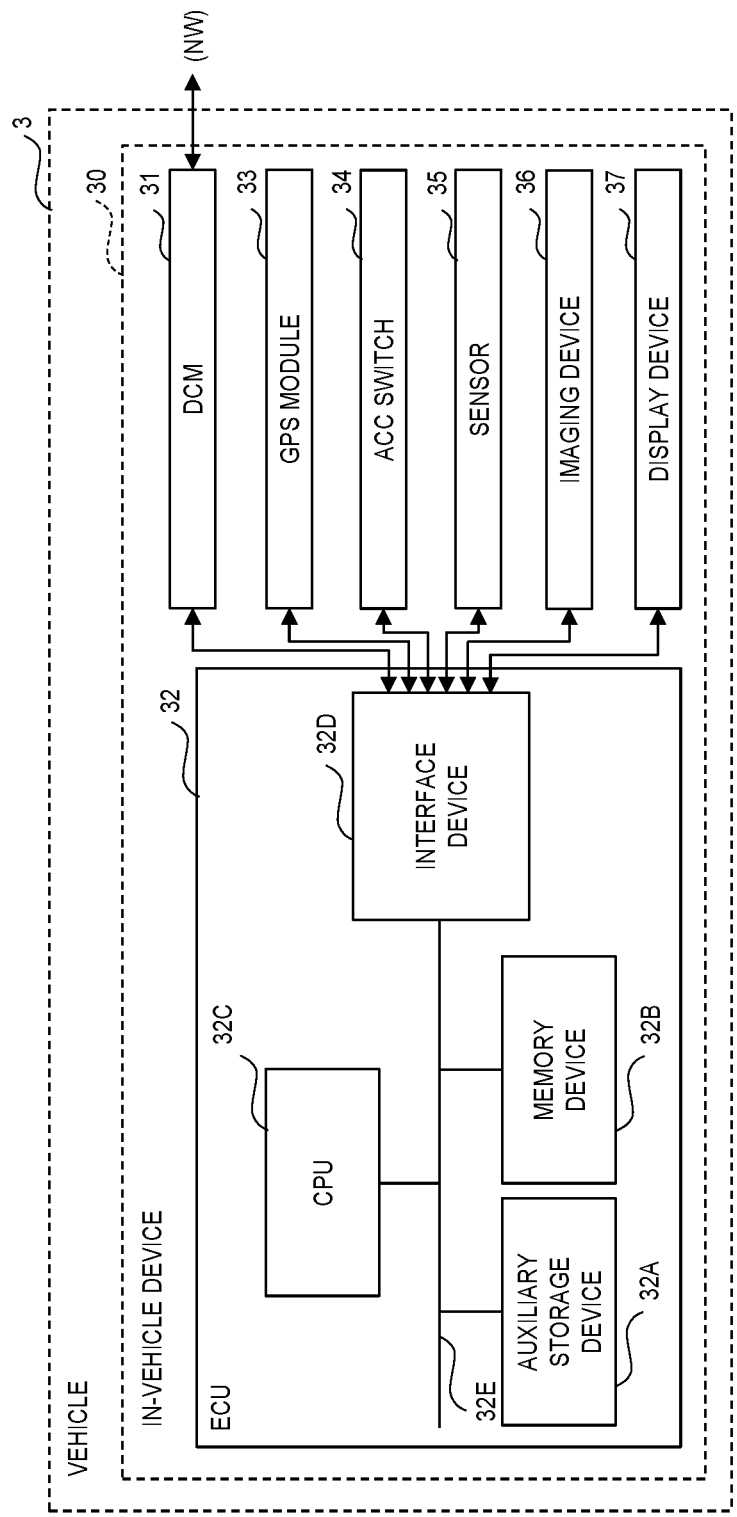
FIG. 2 is a diagram illustrating a hardware configuration example of an ECU 32 of the in-vehicle device 30.

FIG. 2 is a diagram illustrating the hardware configuration example of the ECU 32 of the in-vehicle device 30. The ECU 32 includes an auxiliary storage device 32A, a memory device 32B, a CPU 32C, and an interface device 32D. The auxiliary storage device 32A, the memory device 32B, the CPU 32C, and the interface device 32D are connected to each other via a bus line 32E.

A program that implements various functions of the ECU 32 is provided by a dedicated tool via, for example, a cable that can be attached to and detached from a predetermined external connector connected to the CAN 38, for example, a datalink coupler (DLC). The program is installed in the auxiliary storage device 32A of the ECU 32 via a cable, a connector, and an in-vehicle network from the dedicated tool according to a predetermined operation on the dedicated tool. Further, the program may be downloaded from another computer via the communication network NW and be installed in the auxiliary storage device 32A.

The auxiliary storage device 32A may be a hard disk drive (HDD), a flash memory, or the like, which stores installed programs as well as necessary files and data.

The memory device 32B reads the program from the auxiliary storage device 32A and stores it when an instruction is issued to start the program.

The CPU 32C executes the program stored in the memory device 32B, and implements various functions of the ECU 32 according to the program.

The interface device 32D may be, for example, an interface that connects the CPU 32C to the DCM 31 via the CAN 38, and connects the display device 37, the imaging device 36, the sensor 35, and the like, to the DCM 31 via the CAN 38.

Processing functions of the ECU 32 of the in-vehicle device 30 will be described with reference to FIG. 3.

Figure 3:
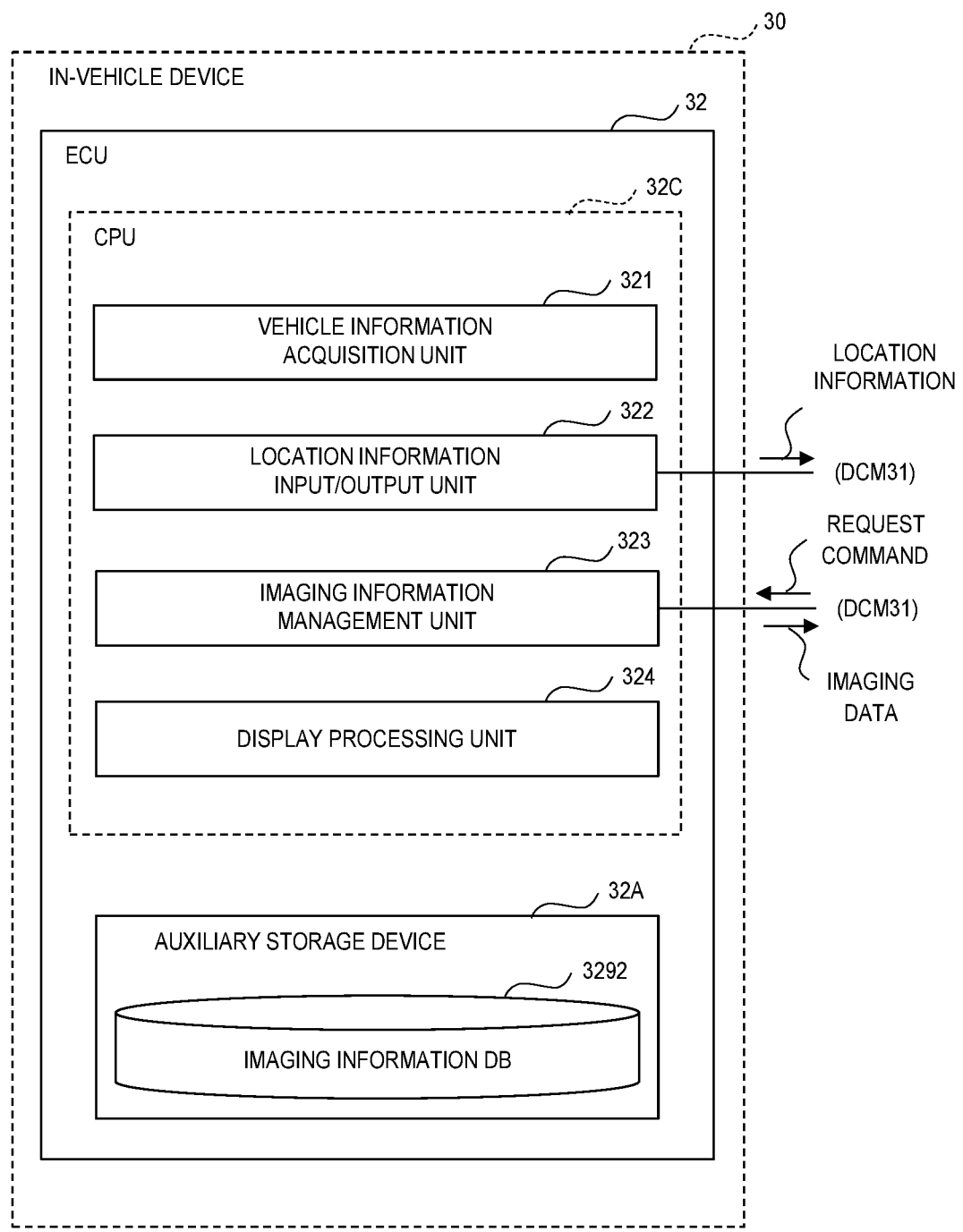
FIG. 3 is a diagram illustrating a configuration example of processing functions in the ECU 32 of the in-vehicle device 30.

FIG. 3 is a diagram illustrating a configuration example of the processing functions in the ECU 32 of the in-vehicle device 30. The CPU 32C of the ECU 32 includes a vehicle information acquisition unit 321, a location information input/output unit 322, an imaging information management unit 323, and a display processing unit 324. These functions are implemented by the CPU 32C executing the program stored in the memory device 32B or the auxiliary storage device 32A shown in FIG. 2.

The vehicle information acquisition unit 321 acquires vehicle information input from the GPS module 33, the ACC switch 34, the sensor 35, the imaging device 36, and the like (shown in FIG. 1), from a buffer or the like in the RAM. Specifically, the vehicle information acquisition unit 321 acquires the location information of the vehicle 3 input from the GPS module 33. Further, the vehicle information acquisition unit 321 acquires a signal (ON signal or OFF signal) related to the ON/OFF state of the ACC switch 34, which is input from the ACC switch 34. The vehicle information acquisition unit 321 acquires information (vehicle speed information) on the speed of the vehicle 3, which is input from the sensor 35. The vehicle information acquisition unit 321 acquires the imaging data input from the imaging device 36.

The location information input/output unit 322 inputs the location information from the GPS module 33 among several pieces of vehicle information acquired by the vehicle information acquisition unit 321. The location information input/output unit 322 outputs the input location information to the DCM 31 in order to transmit such information to the central server 5.

The imaging information management unit 323 inputs the imaging information (including imaging data and time information when the imaging data is generated) among several pieces of vehicle information acquired by the vehicle information acquisition unit 321. Further, the imaging information management unit 323 inputs the location information from, for example, the GPS module 33 or the location information input/output unit 322. The imaging information management unit 323 associates the imaging data, the time information (information indicating a time, information indicating a time period, and the like) with the location information, and records the associated data (for example, table information) in the auxiliary storage device 32A as an imaging information DB 3292.

For example, the imaging information management unit 323 may input the imaging data input from the imaging device 36 during a certain period of time (for example, two hours, such as a period from the current time '12:00_ back to the time '10:00_ two hours before), and creates an imaging data table (imaging information DB 3292), in which the time and the location information are embedded into the input imaging data.

The imaging information management unit 323 may be configured to delete from the imaging information DB 3292 the imaging data stored in a time period going back from a certain time (for example, a time before '10:00_). As stated above, the imaging data only for a certain time is kept and imaging data acquired in another time period is deleted, whereby the resources of the auxiliary storage device 32A can be effectively utilized. Further, even in a case where a command ('imaging data request command_ or simply 'request command_) indicating a transmission request for the imaging data is issued from the central server 5 (described later), the data captured within the certain time period is kept in the imaging information DB 3292. Therefore, it is possible to transmit the imaging data corresponding to the transmission request to the central server 5.

The auxiliary storage device 32A may include, for example, the imaging information DB 3292. As stated above, the imaging information DB 3292 includes the imaging data, the time information (information indicating a time, information indicating a time period, and the like), and the location information.

The time may be, for example, time information, such as '16:12, 04-11-19_ when the imaging data is generated. The time period may be, for example, time information, such as 'between 16:12 and 18:12, 04-11-19_. The location information is information indicating a vehicle location (latitude (northern latitude) and longitude (east longitude)) measured by the GPS module 33 at the time or during the time period when the imaging data is generated.

The imaging data may be still image data or video data. In a case where the imaging data is still image data at a specific time, the imaging information DB 3292 stores, for example, still image data captured at '16:12, 04-11-19_ and the vehicle location measured by the GPS module 33 at such a time, including, for example, 'latitude 35; 41; 59. 2198 . . . _ and 'longitude; 139.30; 47; 1861 . . . _. Further, in a case where the imaging data is video data captured during a specific time period, the imaging information DB 3292 may store, for example, video data captured between '16:12_ and '18:12_ on 'Apr. 11, 2019_ and several pieces of location information measured by the GPS module 33 during such a period.

The display processing unit 324 performs a process of displaying a predetermined information screen on the display device 37 according to the operation by the occupant of the vehicle 3, such as the driver. For example, the display processing unit 324 may perform a process that causes the display device 37 to display various types of information distributed from the central server 5 to the vehicle 3.

A hardware configuration example and a configuration example of the processing functions in the processing device 52 of the central server 5 will be described with reference to FIG. 4.

Figure 4:
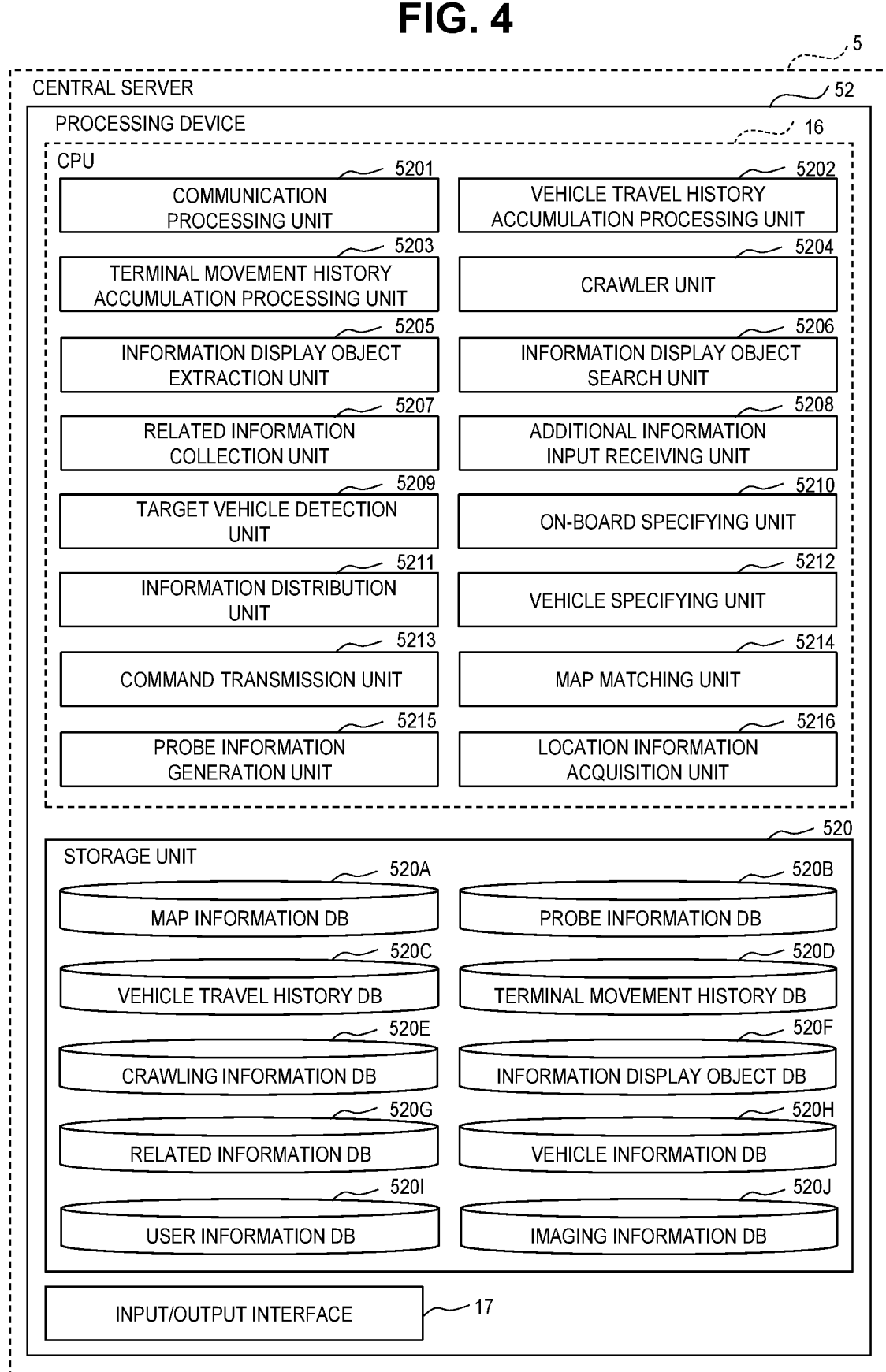
FIG. 4 is a diagram illustrating a hardware configuration example and a configuration example of processing functions in a processing device 52 of a central server 5.

FIG. 4 is a diagram illustrating the hardware configuration example and the configuration example of the processing functions in the processing device 52 of the central server 5. The processing device 52 includes a CPU 16, a storage unit 520, and an input/output interface 17.

The CPU 16 includes a communication processing unit 5201, a vehicle travel history accumulation processing unit 5202, a terminal movement history accumulation processing unit 5203, a crawler unit 5204, an information display object extraction unit 5205, an information display object search unit 5206, and a related information collection unit 5207. Further, the CPU 16 includes an additional information input receiving unit 5208, a target vehicle detection unit 5209, an on-board specifying unit 5210, an information distribution unit 5211, a vehicle specifying unit 5212, a command transmission unit 5213, a map matching unit 5214, a probe information generation unit 5215, and a location information acquisition unit 5216. These functions are implemented by the CPU 16 executing the program stored in the storage unit 520.

The storage unit 520 includes a map information DB 520A, a probe information DB 520B, a vehicle travel history DB 520C, a terminal movement history DB 520D, a crawling information DB 520E, an information display object DB 520F, a related information DB 520G, a vehicle information DB 520H, a user information DB 520I and an imaging information DB 520J.

The communication processing unit 5201 controls the communication device 51 while transmitting and receiving various signals (control signal, information signal, location information, vehicle information, and the like) to and from the vehicles 3.

The vehicle travel history accumulation processing unit 5202 processes probe information, which is sequentially received from each of the vehicles 3 by the communication processing unit 5201 and stored in the probe information DB 520B, and accumulates the processed probe information in the vehicle travel history DB 520C as a travel history of the vehicle 3 (vehicle travel history). For example, the vehicle travel history accumulation processing unit 5202 generates information (trip information) on the travel history for each time period from when the vehicle 3 is started to when the vehicle 3 is stopped, such as for each trip, based on time series data of the probe information of each vehicle 3 stored in the probe information DB 520B. In other words, the vehicle travel history accumulation processing unit 5202 generates the trip information from a departure point to a destination for each trip of the vehicle 3. Specifically, the vehicle travel history accumulation processing unit 5202 determines that the vehicle 3 is started based on a signal of the ACC switch 34, included in the time series data of the probe information, and defines the location information included in the probe information when the vehicle 3 is started as a starting point (departure point) of a single trip of the vehicle 3. the vehicle travel history accumulation processing unit 5202 defines the location information of the vehicle 3 included in the latest probe information including the OFF signal of the ACC switch 34, as an end point (destination) of a single trip of the vehicle 3. The latest probe information is among pieces of probe information that are chronologically later than the probe information when the vehicle 3 is started.

The vehicle travel history accumulation processing unit 5202 combines two pieces of the probe information, which are related to the starting point and the end point of a single trip of the vehicle 3, with several pieces of the probe information (probe information cluster) that are chronologically between those two pieces, as a single piece, thereby generating the trip information. The vehicle travel history accumulation processing unit 5202 associates the generated trip information of each vehicle 3 with identification information (vehicle identification number: VIN (vehicle index number), predetermined vehicle ID (Identifier), and the like) corresponding to each vehicle 3, and saves the associated information in the vehicle travel history DB 520C.

The processing by the vehicle travel history accumulation processing unit 5202 may be performed in real time for the probe information sequentially received from each vehicle 3 via the communication processing unit 5201, or may be performed on pieces of the probe information accumulated for a certain period of time, which has not been processed yet.

The terminal movement history accumulation processing unit 5203 accumulates terminal movement information sequentially received, by the communication processing unit 5201, from several portable terminals, in the terminal movement history DB 520D as a movement history of the portable terminal. Specifically, the terminal movement history accumulation processing unit 5203 associates the terminal movement information of each portable terminal, with identification information corresponding to each portable terminal, for example a predetermined terminal ID, and stores the associated information in the terminal movement history DB 520D.

The processing by the terminal movement history accumulation processing unit 5203 may be performed in real time for the terminal movement information sequentially received from each portable terminal via the communication processing unit 5201, or may be performed on pieces of the terminal movement information accumulated in the buffer of, for example, RAM, for a certain period of time, which has not been processed yet. The portable terminal may be, for example, a portable cell phone, a smartphone, a laptop computer, or a personal handy-phone system (PHS), which is carried by the occupant of the vehicle (driver, fellow passenger, and the like). The portable terminal communicates with the central server via a predetermined communication network according to the wireless communication standards, such as Global System for Mobile Communications+ (GSM), Personal Digital Cellular (PDC), Code-division Multiple Access (CDMA), Long-Term Evolution (LTE), and Worldwide Interoperability for Microwave Access (WiMAX).

The crawler unit 5204 regularly collects (downloads) information on websites and social networks on the Internet based on a known algorithm, and stores the collected information in the crawling information DB 520E.

The information display object extraction unit 5205 extracts an information display object from the imaging data of the imaging device 36, included in the probe information of each of the vehicles 3 stored in the probe information DB 520B, using a known image recognition process. The information display object extraction unit 5205 attaches unique identification information to the extracted information display object, associates the identification information with an image of the information display object and meta information such as the location information of the information display object, and then stores the associated information in the information display object DB 520F. Consequently, previously registered information related to the information display object, such as a standing signboard and digital signage on which the advertisement information of the predetermined advertiser, is displayed, is registered in the information display object DB 520F, as well as information related to the information display object extracted by the information display object extraction unit 5205. Accordingly, since the related information (to be described below) of the information display object to be distributed can be enhanced, convenience for the user is enhanced.

The location information of the information display object attached as meta information may be the location information itself of the vehicle 3 included in the same probe information as the imaging data that is the extraction source, or may be the location information considering the location information of the information display object relative to the vehicle 3, which is calculated from the imaging data. Additionally, in a case where it is determined that the extracted information display object is the same as the information display object already registered in the information display object DB 520F, the information display object extraction unit 5205 does not store information related to the extracted information display object in the information display object DB 520F. Moreover, the processing by the information display object extraction unit 5205 may be performed in real time for the probe information sequentially received from each vehicle 3 via the communication processing unit 5201, or may be performed on pieces of the probe information accumulated for a certain period of time, which have not been processed yet.

The information display object search unit 5206 searches information related to the information display object, of which location can be specified, from crawling information of webpages and social networks stored in the crawling information DB 520E. As a result of the search, the information display object search unit 5206 attaches unique identification information to the searched information display object, attaches an image of the information display object and meta information, such as the location information of the information display objects, to the identification information, and then stores them in the information display object DB 520F.

Additionally, in a case where it is determined that the extracted information display object is the same as the information display object already registered in the information display object DB 520F, the information display object search unit 5206 does not store information related to the extracted information display object in the information display object DB 520F. Moreover, the processing by the information display object search unit 5206 may be performed in real time corresponding to the crawling information DB 520E updated by the crawler unit 5204, or may be performed on pieces of the crawling information accumulated for a certain period of time.

The related information collection unit 5207 collects the related information of the information display object registered in the information display object DB 520F from the image of the information display object and the crawling information of webpages and social networks stored in the crawling information DB 520E, extracted by the information display object extraction unit 5205. The related information of the information display object includes the contents of the information displayed on the information display object, which is collected based on the image of the information display object. Additionally, the related information of the information display object includes the location information including route guidance information of places and facilities related to information displayed on the information display object, for example, the location information of stores and facilities, which desire to guide visitors using advertisement information displayed on the information display object. Further, the related information of the information display object incised additional information. The additional information shows details of the information displayed on the information display object, supplementary information that further complements the information displayed on the information display object, latest information related to the information displayed on the information display object (for example, an information on arrival of products related to the advertisement information of a specific store, and sales information, which can be chronologically updated), online review information related to the information displayed on the information display object, or the like. The related information collection unit 5207 associates the collected related information and information on a registration date with the identification information of the corresponding information display object, and stores them in the related information DB 520G. Consequently, as described later, the related information of the information display object distributed to the users vehicle 3 or the portable terminal can be enhanced, so that convenience for the user can be improved.

Further, the processing by the related information collection unit 5207 may be performed in real time corresponding to the extraction processing of the information display object by the information display object extraction unit 5205 and to the update processing of the crawling information DB 520E by the crawler unit 5204, or may be performed on images and pieces of the crawling information of the extracted information display object, which are accumulated for a certain period of time.

The additional information input receiving unit 5208 receives additional information related to the information display object registered in the information display object DB 520F, which is input via an input device of the processing device 52 or the Internet. The additional information input receiving unit 5208 associates the received additional information and information on a registration date with the identification information of the corresponding information display object, as the related information of such information display object, and stores them in the related information DB 520G. For example, the administrator of the central server 5, the advertiser of the advertisement information displayed on the information display object and the like can input the additional information related to the information display object already registered in the information display object DB 520F, via a predetermined input device (not shown) connected to the processing device 52 or a predetermined webpage. Consequently, as described later, the related information of the information display object distributed to the users vehicle 3 or the portable terminal can be enhanced, so that convenience for the user can be improved.

The target vehicle detection unit 5209 detects the vehicle 3 (target vehicle) located around the information display object registered in the information display object DB 520F, based on the location information included in the latest probe information received from each of the vehicles 3 by the communication processing unit 5201. Specifically, the target vehicle detection unit 5209 detects the vehicle 3 which is located on a road adjacent to an installation location of each information display object registered in the information display object DB 520F, that is, a road in which each information display object is visually recognizable from the vehicle 3 while passing through, in a state in which the vehicle is heading toward the information display object.

Further, the target vehicle detection unit 5209 determines whether or not the vehicle 3 has entered the vicinity of the information display object corresponding to the vehicle 3 (for example, in front of the information display object installed on a road side, or below the information display object installed just above a road), based on the location information of the vehicle 3, which is the target vehicle, sequentially received by the communication processing unit 5201. That is, the target vehicle detection unit 5209 determines whether or not the vehicle 3, which is the target vehicle, has passed through a section, in which the information display object is visually recognizable, on a road adjacent to the information display object (hereinafter referred to as 'recognizable section_). It is because, since it is typical that the occupant of the vehicle 3 visually recognizes the information display object in front of or on a side of the vehicle 3, in a case where the vehicle 3 passes in the front of the information display object installed on the road side, or passes below the information display object installed above the road, the occupant cannot see the information display object.

The information display object, such as a digital signage displaying various information based on the information distributed from the central server, may have a function of the target vehicle detection unit 5209 based on the premise that the central server 5 is communicably connected to, for example, such an information display object (digital signage). In this case, the information display object may be configured to detect the target vehicle (vehicle 3) based on an output of a sensor such as a camera installed on the information display object and may transmit the detection result to the central server 5.

The on-board specifying unit 5210 specifies a user who is on the vehicle 3 (target vehicle) detected by the target vehicle detection unit 5209 based on the vehicle information DB 520H. The portable terminal of the user using each vehicle 3, which is associated with each vehicle 3, is registered in the vehicle information DB 520H. Consequently, the on-board specifying unit 5210 is able to specify the user of the portable terminal registered in association with the vehicle 3 detected by the target vehicle detection unit 5209, as the user who may be on the vehicle 3.

Further, the on-board specifying unit 5210 determines whether or not the user who may be on the vehicle 3, for example the target vehicle, is actually on the vehicle 3. For example, the on-board specifying unit 5210 compares the location information, received by the communication processing unit 5201, included in the latest terminal movement information of the portable terminal held by the user who may be on the vehicle 3, with the location information included in the latest probe information of the vehicle 3, stored in the probe information DB 520B. Consequently, the on-board specifying unit 5210 can determine whether or not the user of the portable terminal is on the vehicle 3, thereby specifying the user who is on the vehicle 3.

Further, the associated information between the portable terminal and the vehicle 3 registered in the vehicle information DB 520H may be defined by an online registration processing of the vehicle 3 and the user of the portable terminal, via a predetermined website. Moreover, the associated information between the portable terminal and the vehicle 3 stored in the vehicle information DB 520H may be also defined, for example, by comparing the travel history of the vehicle 3 (vehicle travel history) stored in the vehicle travel history DB 520C and the movement history of the portable terminal (terminal movement history) stored in the terminal movement history DB 520D. Specifically, in a case where the certain trip information included in the vehicle travel history of the certain vehicle 3 matches a part of the terminal movement history of the certain portable terminal, it is possible to determine that the user of the portable terminal is on the vehicle 3. Therefore, the vehicle information DB 520H may be configured by specifying the portable terminal of each user using each vehicle 3, based on, for example, an on-board history (how many times the user gets on the vehicle) for each vehicle 3.

In a case where the target vehicle detection unit 5209 detects the fact that the target vehicle (vehicle 3) has passed through the vicinity of the corresponding information display object, the information distribution unit 5211 distributes the related information of the information display object to the vehicle 3, and to the portable terminal held by the user who is on the vehicle 3, specified by the on-board specifying unit 5210, via the communication processing unit 5201. Consequently, the occupant (user) who is on the vehicle 3 can confirm in real time the related information of the information display object, distributed to the vehicle 3 or the portable terminal held by the user, via the display device 37 of the vehicle 3 or a display of the portable terminal. Therefore, for example, even in a case where the user who is on the vehicle 3 cannot see the information display object or cannot fully understand the information displayed on the information display object, it is possible to help the user to understand the information displayed on the information display object since the related information of the information display object is directly provided.

The information distribution unit 5211 may distribute the related information of the information display object to the portable terminal held by the user who may be on the target vehicle (vehicle 3) detected by the target vehicle detection unit 5209, for example, the portable terminal registered in the vehicle information DB 520H in association with the vehicle 3.

Additionally, in a case where it is determined that the target vehicle (vehicle 3) detected by the target vehicle detection unit 5209 has passed through the vicinity of the corresponding information display object, the information distribution unit 5211 distributes the related information of the information display object to an account corresponding to the user in an online service (hereinafter simply referred to as the online service) such that the user who is on the vehicle 3 or the user who may be on the vehicle 3 receives and sees the information, via the communication processing unit 5201. Accordingly, the user who is on the vehicle 3 can, later, comfortably check the related information of the information display object distributed to his/her account in the online service, such as a mailing service or SNS service that the user is using. In the user information DB 520I, for example, information on the online service account previously registered by the user of the vehicle 3 or the portable terminal, via the predetermined webpage, is registered in association with at least one of the vehicle 3 and the portable terminal. Therefore, the information distribution unit 5211 can determine that the account associated with the vehicle 3 detected by the target vehicle detection unit 5209 in the user information DB 520I is the account owned by the user who may be on the vehicle 3. Additionally, the information distribution unit 5211 can determine that the account associated with the portable terminal, held by the user who is specified to be on the vehicle 3 by the on-board specifying unit 5210, in the user information DB 520I is the account owned by the user who is on the vehicle 3.

The location information acquisition unit 5216 acquires the location information transmitted from the location information input/output unit 322 of the in-vehicle device 30 via the communication processing unit 5201, and inputs the acquired location information to the vehicle specifying unit 5212.

The vehicle specifying unit 5212 specifies, based on the location information, the vehicle that has passed through a geographical location or area of the target from which the imaging data captured by the imaging device 36 is collected. The geographical location or area of the target from which the imaging data is collected can be exemplified as the following places.

(1) Creating 3D advanced dynamic map information (dynamic map) used for automatic driving of the vehicle requires the latest image obtained by capturing a scene in which the vehicle actually travels. The scene for which the dynamic map is to be created can be an example of the geographical location or area from which the imaging data is collected.

(2) For example, in a case where an airbag is activated due to a collision accident between vehicles, or where it is difficult to use an in-vehicle radar due to heavy snow, the central server 5 can determine that an emergency situation may occur involving the vehicle itself or around the vehicle, based on the vehicle information transmitted from the vehicle. When the central server 5 has determined that the emergency situation may occur in such a manner, the central server 5 requires an image of the field where the emergency situation may occur for confirming the situation, or for informing the user about the situation, to the user who is in the vicinity of such afield in real time. The field in which it is determined that an emergency situation may occur can be an example of the geographical location or area from which the imaging data is collected.

(3) For example, in a case where an emergency avoidance operation is made, such as abrupt steering or abrupt braking, in order to avoid a collision with or approaching a signboard, falling rocks, or debris from a landslide scattered on the road due to strong winds or heavy rain, the central server 5 can determine that the emergency avoidance operation may be made based on the vehicle information transmitted from the vehicle. When the central server 5 has determined that the emergency avoidance operation may be made in this manner, the central server 5 requires an image of the field where the emergency avoidance operation is made for distributing, in real time, regarding a situation around the road where the fallen objects are, for which the emergency avoidance operation is made. The field in which it is determined that the emergency avoidance operation may be made can be an example of the geographical location or area from which the imaging data is to be collected.

(4) Additionally, in a case where the central server 5 receives from the user a distribution request for the latest image for confirming the latest road sign situation, the latest weather condition, the latest signs at a destination facility, or the appearance of the destination facility, for example, and when the vehicle travels on a specific route using a navigation device, a target area for which the user transmits the distribution request can be an example of the geographical location or area from which the imaging data is collected. The latest road sign situation may be, for example, the speed limit sign of a highway that changes from moment to moment. The latest weather condition may be, for example, the actual weather near an exit of a long tunnel.

Figure 5:
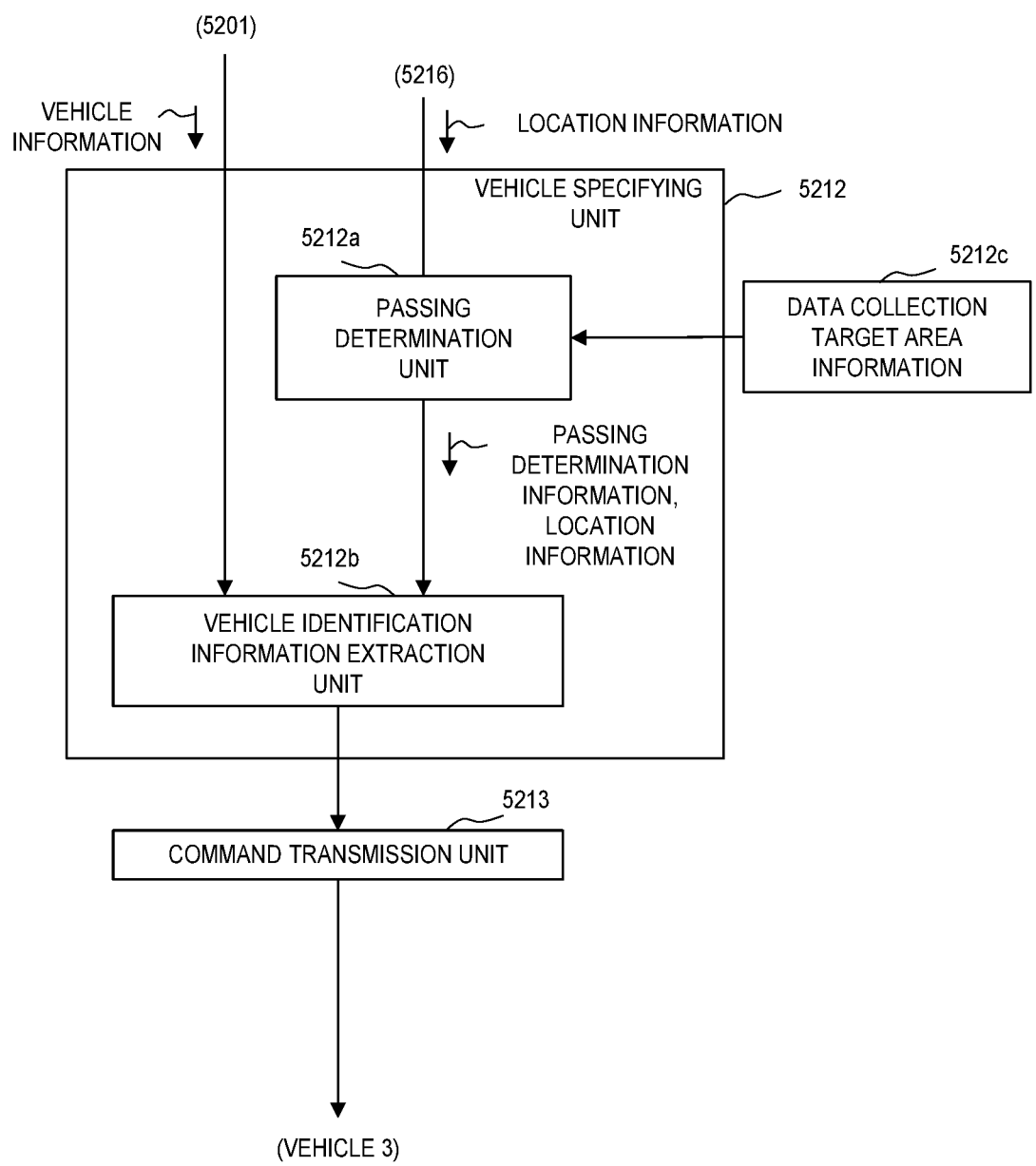
FIG. 5 is a diagram illustrating an example of a functional configuration of a vehicle specifying unit 5212.

As stated above, there are various examples of the geographical location or area from which the imaging data is collected. As shown in FIG. 5, data collection target area information 5212*c* indicating any one of those locations or areas is set in the vehicle specifying unit 5212.

FIG. 5 is a diagram illustrating an example of a functional configuration of the vehicle specifying unit 5212. As shown in FIG. 5, the vehicle specifying unit 5212 includes a passing determination unit 5212*a* and a vehicle identification information extraction unit 5212*b*.

When the location information transmitted from each vehicle is input, the passing determination unit 5212*a* determines (decides) the vehicle that has passed through the location or the area by comparing the data collection target area information 5212*c* (location or area of the target) with the location information.

In a case where there is a vehicle that has passed through the area, the passing determination unit 5212*a* inputs, to the vehicle identification information extraction unit 5212*b*, a set of passing determination information indicating there is a vehicle that has passed through the area, and the location information of the vehicle that has passed through the area.

The vehicle identification information extraction unit 5212*b* specifies the location information that matches the location information of the vehicle that is determined to have passed through by the passing determination unit 5212*a*, among pieces of the location information included in the vehicle information transmitted from each of the in-vehicle devices 30.

The vehicle identification information extraction unit 5212*b* selects the vehicle information including the specified location information, among pieces of the vehicle information transmitted from each of the in-vehicle devices 30, and extracts the vehicle identification information included in the selected vehicle information. The vehicle identification information extraction unit 5212*b* that has extracted the vehicle identification information transfers the extracted vehicle identification information to the command transmission unit 5213. The vehicle identification information is identification information for uniquely identifying a vehicle, such as a VIN and a predetermined vehicle ID.

The command transmission unit 5213 that has received the vehicle identification information from the vehicle specifying unit 5212 transmits an imaging data request command to the vehicle to which the vehicle identification information is assigned, among a cluster of the vehicles communicably connected to the central server 5, via the communication network NW. The imaging data distributed in response to the imaging data request command is associated with the data collection target area information and recorded in the storage unit 520 as the imaging information DB 520J shown in FIG. 4.

The map matching unit 5214 specifies a road link corresponding to the location information of the vehicle 3, for example a road link on which the vehicle 3 is currently located, based on the map information DB 520A and the location information from the location information input/output unit 322.

The map information DB 520A is configured by geographic information system (GIS) data including nodes corresponding to intersections, road links connecting the nodes and lines, and polygons corresponding to features, such as buildings and roads. For example, identification information, such as a link ID, is defined for each of the road links constituting a road network included in the map information DB 520A. The map matching unit 5214 specifies the link ID of the road link on which the vehicle 3 is currently located by referring to the map information DB 520A.

The probe information generation unit 5215 generates probe information including various vehicle information acquired by the vehicle information acquisition unit 321, time information corresponding to the various vehicle information, and the road link specified by the map matching unit 5214. Then, the probe information generation unit 5215 stores the generated probe information in the probe information DB 520B.

A collecting operation of the imaging data in response to a request for transmitting imaging data will be described hereinbelow with reference to FIG. 6.

Figure 6:
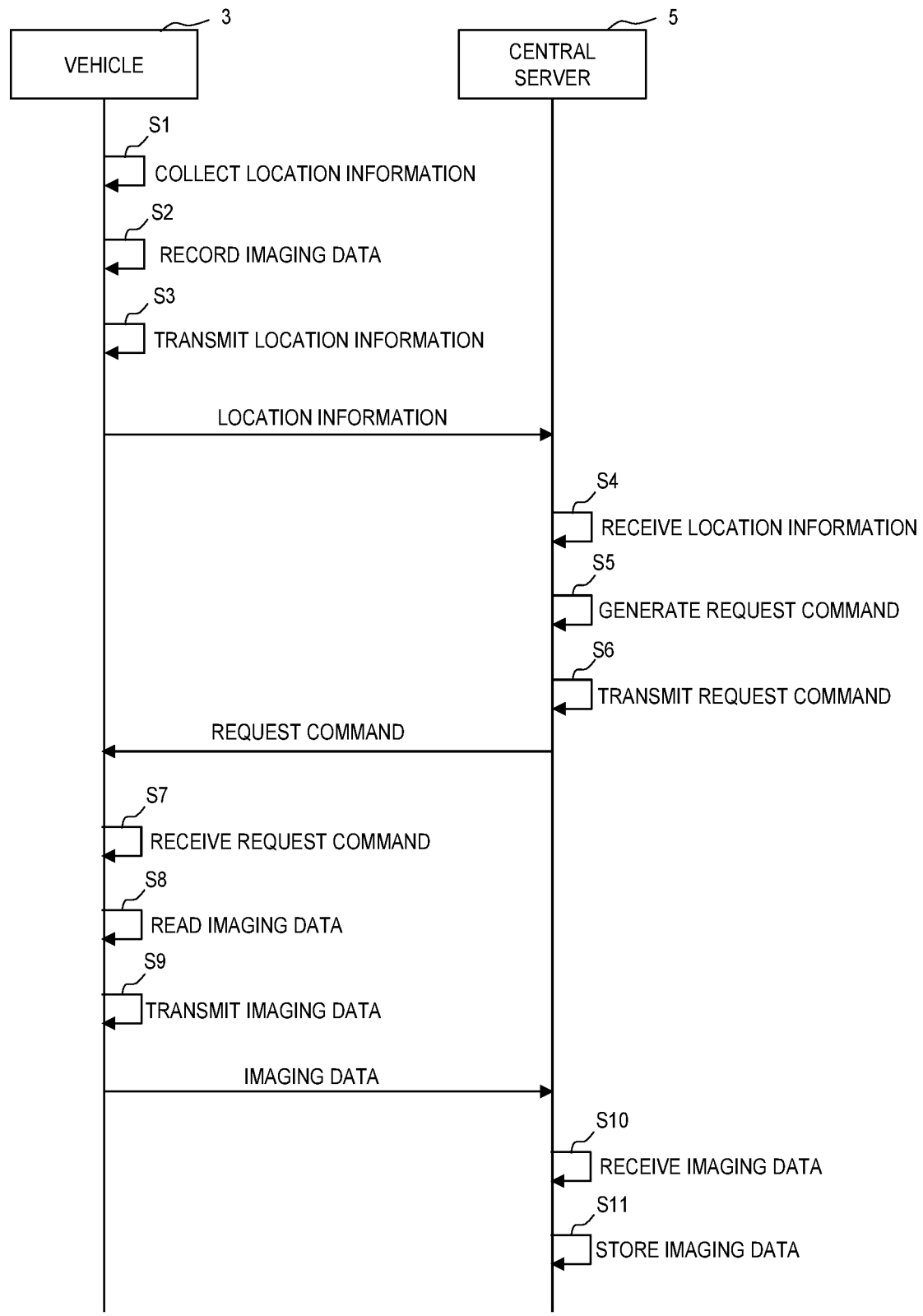
FIG. 6 is a sequence chart illustrating a collecting operation of imaging data in response to a request for transmitting imaging data.

FIG. 6 is a sequence chart illustrating the collecting operation of the imaging data in response to the request for transmitting imaging data. The location information is collected in the vehicle (step S1), and the imaging data is recorded in the vehicle (step S2). The processing operation of step S2 may be performed in parallel with the processing of step S1. The collected location information is sequentially transmitted to the central server 5 (step S3). When the central server 5 receives the location information (step S4), the central server 5 generates a request command indicating the request for transmitting imaging data based on the location information (step S5). The request command is transmitted to the vehicle (step S6). When the vehicle receives a request signal (step S7), the stored imaging data is read (step S8) and uploaded to the central server 5 (step S9). When the central server 5 receives the imaging data (step S10), the central server 5 stores the received imaging data therein (step S11).

The imaging data stored in the central server 5 may be used, for example, for creating a dynamic map, specifying the abnormal cause of the vehicle, and specifying the cause of the emergency avoidance operation. Furthermore, it is used to provide the latest road sign situation, weather conditions, facility appearances and the like, in a specific area. Specific examples thereof will be described with reference to FIG. 7.

Figure 7:
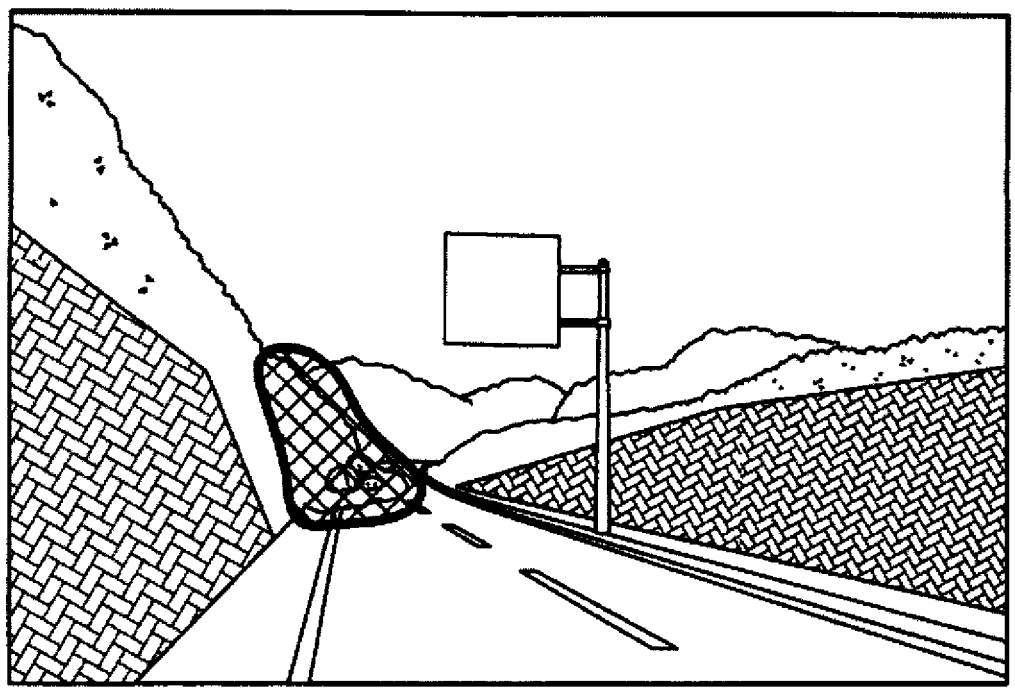
FIG. 7 is a diagram illustrating a first example of an image displayed based on the imaging data stored in the central server 5.

FIG. 7 is a diagram illustrating a first example of an image displayed based on the imaging data stored in the central server 5. As shown in FIG. 7, for example, an image of an area where an emergency avoidance operation has been made is displayed on a display screen of the portable terminal in order to avoid a vehicle collision with falling rocks caused by a landslide. By providing such an image to the user or the like who wants to pass through the area, it is possible to provide details of the situation in the area where the rock-fall has occurred. The user who has seen this images, may select any option, such as searching for a bypass, upon determining that it is difficult to pass through the area because of damage suffered by falling rocks, or it may be determined that he/she can pass through the area without finding a bypass because the damage is minor. Therefore, the user can smoothly arrive at the destination.

Figure 8:
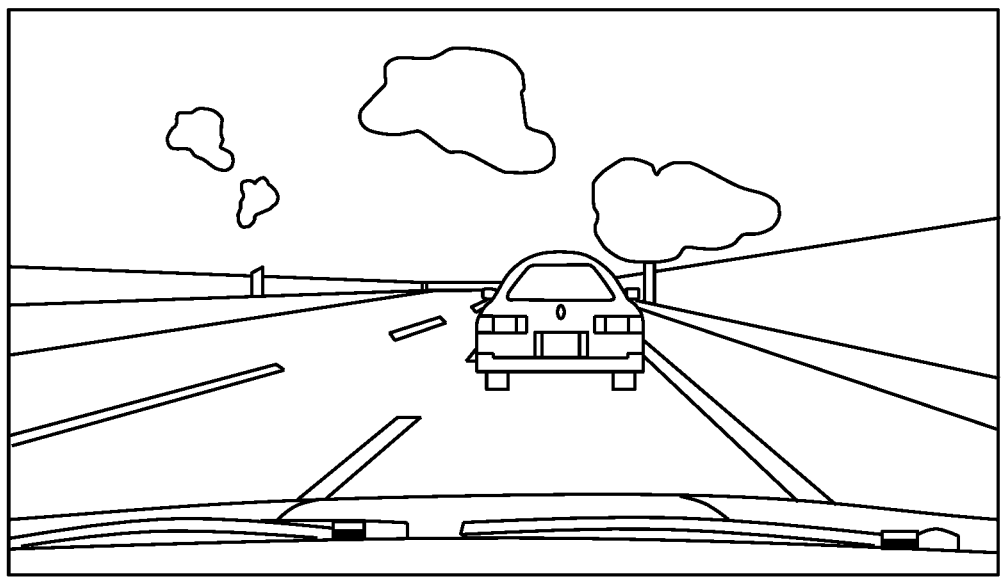
FIG. 8 is a diagram illustrating a second example of the image displayed based on the imaging data stored in the central server 5.
Figure 8:
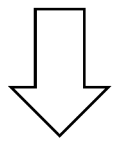
Figure 8:
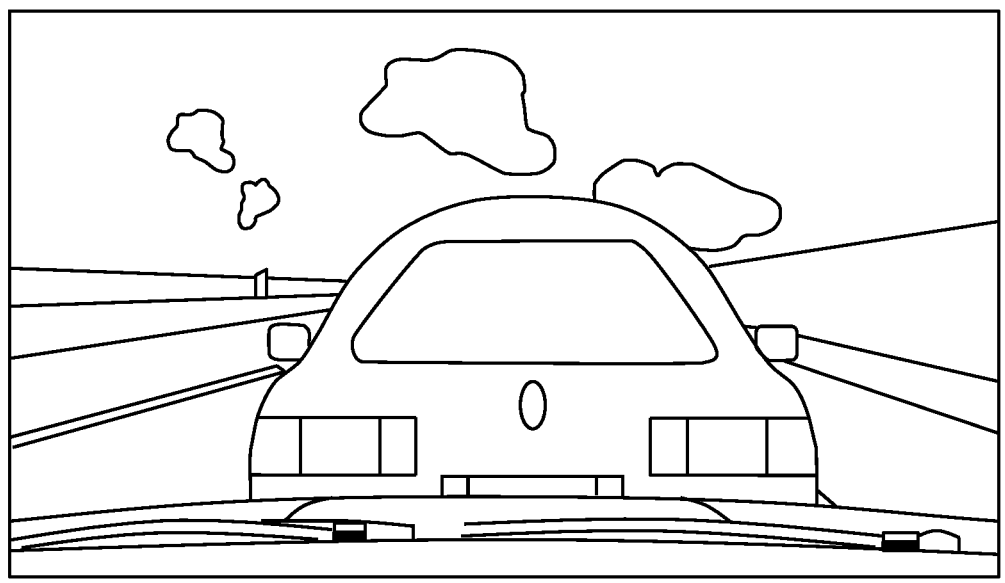

FIG. 8 is a diagram illustrating a second example of an image displayed based on the imaging data stored in the central server 5. As shown in FIG. 8, for example, a video captured during a certain period of time around a collision between vehicles is displayed on the display screen of the portable terminal. By providing such an image to the user or the like who wants to pass through the area, it is possible to see the accident itself or the surrounding situation after the accident. Therefore, the user who has seen this images, may select any option, such as searching for a bypass upon determining that time is needed for traffic to resume as normal while referring to the situation such as VICS$^+$ when a serious accident occurred, or passing through the area in a short time without finding a bypass even though some rubbernecking traffic congestion may occur when the accident is a minor collision. Therefore, the user can smoothly arrive at the destination.

Figure 9:
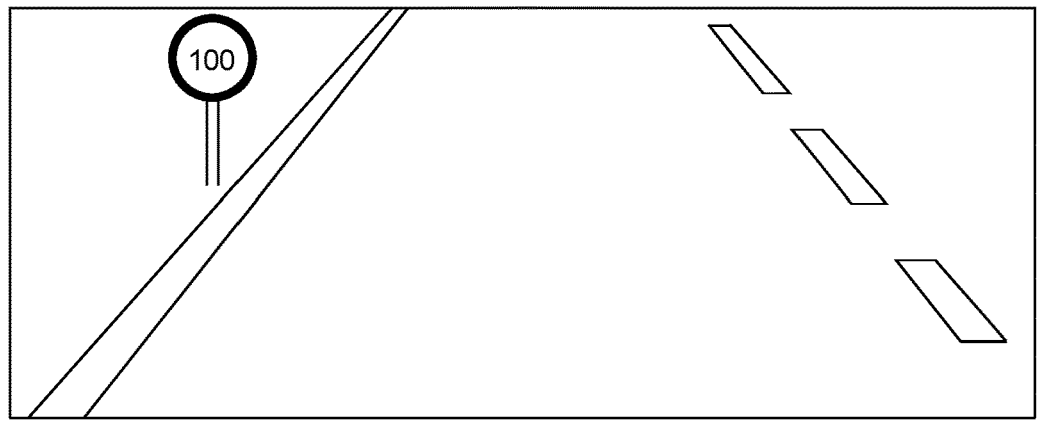
FIG. 9 is a diagram illustrating a third example of the image displayed based on the imaging data stored in the central server 5.

FIG. 9 is a diagram illustrating a third example of an image displayed based on the imaging data stored in the central server 5. As shown in FIG. 9, for example, a light signboard for displaying the speed limit is shown on the display screen of the portable terminal. In the light signboard, for example, the speed limit before the weather gets better is '50 km/h_, but the latest speed limit after the bad weather subsided is updated to '100 km/h_. By providing such an image to the user who wants to pass through the area, the user who has seen the image can predict that the arrival time at the destination will be earlier than expected because the user can pass through the area at high speed, thus the user can comfortably arrive at the destination.

As stated above, the central server 5 as an example of the information processing apparatus according to the present embodiment, includes the location information acquisition unit 5216 that acquires the location information of each vehicle. The central server 5 is further provided with the vehicle specifying unit 5212 that specifies, based on the location information, the vehicle that has passed through a geographical location or area of the target from which the imaging data captured by the imaging device is collected. The central server 5 is further provided with the command transmission unit 5213 that transmits a command that requests transmission of the imaging data to the specified vehicle among the plurality of vehicles.

With this configuration, the vehicle that has actually traveled to (passed through) a point from which the road information is collected is specified, and the imaging data from the specified vehicle is collected by the central server 5. In comparison to a case where a vehicle that is scheduled to pass through the point from which the road information is collected is specified, the opportunities for collecting the road information are less limited.

Moreover, the road information is transmitted from the vehicle which has actually traveled (passed through) to the point from which the road information is collected. Therefore, in comparison to a case where the road information is uploaded from all vehicles capable of communicating with the central server 5, for example, a case where the road information is also uploaded from the vehicle that has not traveled to the point from which the road information is collected, in the present embodiment, only imaging data captured at a time when such an event occurs or during a certain period is uploaded.

Accordingly, an increase in the amount of uploaded data can be reduced, thus the overall data communication amount is reduced, thereby reducing communication costs and influence on communication traffic. By reducing the influence on communication traffic, it is possible to more effectively use communication resources. Further, since an increase in the amount of uploaded data is reduced, the burden of data processing in the central server 5, and memory capacity for imaging data in the central server 5 can also be reduced, whereby it is possible to reduce manufacturing costs of the central server 5.

Further, the vehicle specifying unit 5212 according to the present embodiment may be configured to include the passing determination unit 5212a which determines, among the plurality of vehicles, the vehicle that has passed through the geographical location or area of the target from which the imaging data is collected, by comparing the data collection target area information 5212c indicating the geographical location or area of the target from which the imaging data is collected, with the location information.

With this configuration, by using the data collection target area information 5212c, it is possible to collect imaging data after specifying the vehicles that have passed through an area where an event such as an emergency avoidance operation or accident may have occurred. Consequently, even in a case where, for example, a severe accident occurs and the imaging data is uploaded from lots of vehicles, setting of the data collection target area information 5212c is adjusted to focus on the specific event while uploading the imaging data, whereby the burden of data processing in the central server 5 is reduced and the delay in information distribution to the user is prevented.

The processing device 52 of the central server 5 according to the present embodiment may be configured as follows.

Figure 10:
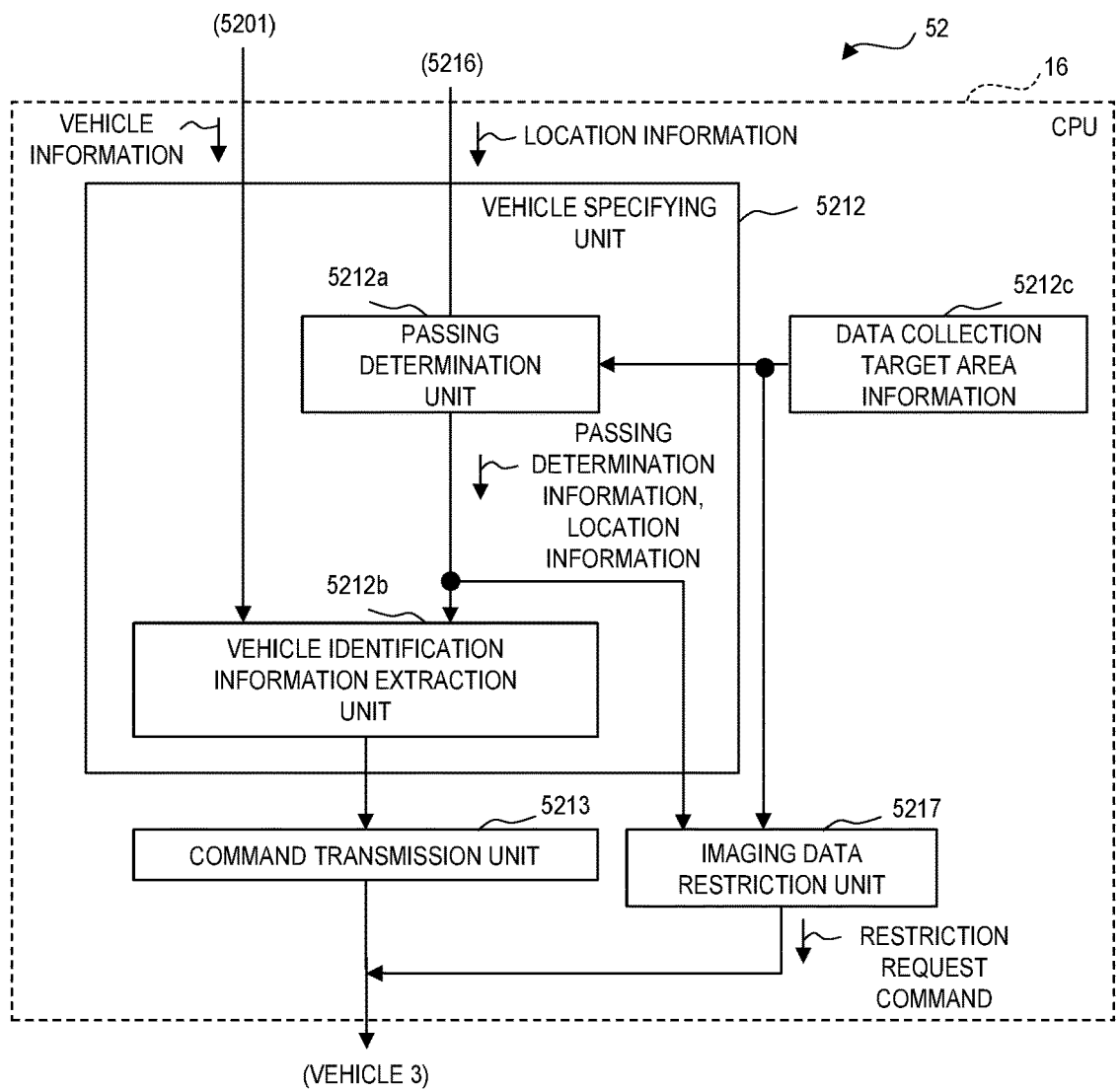
FIG. 10 is a diagram illustrating a configuration example according to modification of the processing device 52 of the central server 5.

FIG. 10 is a diagram illustrating a configuration example according to modification of the processing device 52 of the central server 5. The processing device 52 shown in FIG. 10 includes an imaging data restriction unit 5217, in addition to the vehicle specifying unit 5212 and the command transmission unit 5213.

The imaging data restriction unit 5217 inputs information from the passing determination unit 5212a (passing determination information and location information) and the data collection target area information 5212c (location or area from the imaging data is collected), and specifies an entry location of the vehicle that has entered the location or area from where the imaging data is collected and an exit location of the vehicle 3 that has left the location or area from where the imaging data is collected.

The imaging data restriction unit 5217 that has specified the entry location and the exit location generates a restriction request command which restricts the imaging data transmitted from the vehicle to the central server 5 to data captured during a period from when the vehicle has passed through the entry location to when the vehicle has passed through the exit location. The restriction request command may include, for example, the time when the vehicle has passed through the entry location, and the time when the vehicle has passed through the exit location. The restriction request command is input to the imaging information management unit 323 on a vehicle side.

The imaging information management unit 323 on the vehicle side that has input the restriction request command refers to the time recorded in the imaging information DB 3292, extracts only the imaging data captured during a time period from when the vehicle has passed through the entry location to the time when the vehicle has passed through the exit location, and transmits the imaging data to the central server 5 via the DCM 31.

According to the processing device 52 of the central server 5 shown in FIG. 10, since the imaging data restriction unit 5217 is provided, the amount of data of the uploaded imaging data is reduced in comparison to a case where all imaging data recorded in the vehicle that has passed through the location or area of the target is uploaded, thus it is possible to further reduce communication costs and influence on communication traffic.

The data restricted by the imaging data restriction unit 5217 is not limited to data captured during a time period from when the vehicle has passed through the entry location to the time when the vehicle has passed through the exit location; the data may have a margin of minutes around the time when the vehicle has entered the target area, or around the time when the vehicle has left from the target area. Even in a case of this configuration, the data restricted by the imaging data restriction unit 5217 is restricted to data captured during a time period from when the vehicle has entered the target area to when the vehicle has left the target area. Thus, the amount of data of the uploaded imaging data is reduced, and it is possible to further reduce communication costs and influence on communication traffic.

In addition, the information processing program according to the present embodiment causes a computer, that is capable of communicating with the vehicles each equipped with the imaging device, to execute a step of acquiring location information of each of the vehicles. The information processing program also causes the computer to execute a step of specifying, based on the location information, the vehicle that has passed through the geographical location or area of the target from which imaging data captured by the imaging device is collected. The information processing program also causes the computer to execute a step of transmitting the command that requests transmission of the imaging data to the specified vehicle among the plurality of vehicles. Accordingly, it is possible to prevent opportunities for collecting road information from being limited without significantly modifying the central server 5.

The configuration described in the present embodiment shows an example of the present disclosure, and can be combined with another known technique, or it is also possible to omit or change part of the configuration without departing from the gist of the present disclosure.

What is claimed is:

1. An information processing apparatus that communicates with a plurality of vehicles, and each of the plurality of vehicles is equipped with an imaging device, the information processing apparatus comprising:
a processor programmed to:
acquire location information and vehicle operation information of each vehicle of the plurality of vehicles;
determine an operating situation of a first vehicle of the plurality of vehicles based on the acquired vehicle operation information, the operating situation of the first vehicle causing the information processing apparatus to perform at least one process of (i) creating a dynamic map, (ii) determining a cause of an abnormal movement or action of the first vehicle, and (iii) determining a cause of an emergency avoidance operation;
specify, based on the location information, a second vehicle of the plurality of vehicles that has passed through a geographical location or geographical area of a target from which imaging data captured by the imaging device is collected, the geographical location or the geographical area of the target being where a vehicular accident has occurred and the determined operating situation of the first vehicle has occurred; and
transmit a command that requests transmission of the captured imaging data to the specified vehicle of the plurality of vehicles, the captured imaging data providing at least an image implemented to perform the at least one process.

2. The information processing apparatus according to claim 1, wherein the processor is programmed to determine, among the plurality of vehicles, a vehicle that has passed through the geographical location or the geographical area of the target from which the imaging data is collected, by checking data collection target area information against the location information, the data collection target area information indicating the geographical location or the geographical area of the target from which the imaging data is collected.

3. The information processing apparatus according to claim 1, wherein the processor is programmed to restrict the imaging data, which is transmitted from the specified vehicle to data captured during a time period from when the vehicle has entered the geographical location or the geographical area of the target to when the vehicle has left the geographical location or the geographical area of the target, the image data being restricted based on passing determination information indicating whether the specified vehicle has passed through the geographical location or the geographical area, and data collection target area information indicating the geographical location or the geographical area of the target.

4. A non-transitory computer-readable storage medium storing an information processing program causing a computer configured to communicate with a plurality of vehicles, and each vehicle of the plurality of vehicles is equipped with an imaging device, the information processing program causing the computer to execute:
acquiring location information and vehicle operation information of each vehicle of the plurality of vehicles;
determining an operating situation of a first vehicle of the plurality of vehicles based on the acquired vehicle operation information, the operating situation of the first vehicle causing the computer to perform at least one of (i) creating a dynamic map, (ii) determining a cause of an abnormal movement or action of the first vehicle, and (iii) determining a cause of an emergency avoidance operation;
specifying, based on the acquired location information, a second vehicle of the plurality of vehicles that has passed through a geographical location or a geographical area of a target from which imaging data captured by the imaging device is collected, the geographical location or the geographical area of the target being where a vehicular accident of the first vehicle has occurred and the determined operating situation of the first vehicle has occurred; and
transmitting a command that requests transmission of the captured imaging data to the specified vehicle among the plurality of vehicles, the captured imaging data providing at least an image implemented to perform the at least one process.

\* \* \* \* \*

UNITED STATES PATENT AND TRADEMARK OFFICE
CERTIFICATE OF CORRECTION

Page 1 of 1

PATENT NO. : 11,051,146 B2
APPLICATION NO. : 16/831962
DATED : June 29, 2021
INVENTOR(S) : Yasuyuki Kusumoto It is certified that error appears in the above-identified patent and that said Letters Patent is hereby corrected as shown below:

On the Title Page

Priority information is missing. Please add the following:
Item (30) -- Priority Application: 2019-090090
Date: May 10, 2019 --

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*